March 22, 1938.   J. E. PADGETT   2,111,721
AUTOMATIC CLUTCH MECHANISM
Filed March 9, 1933   2 Sheets-Sheet 1
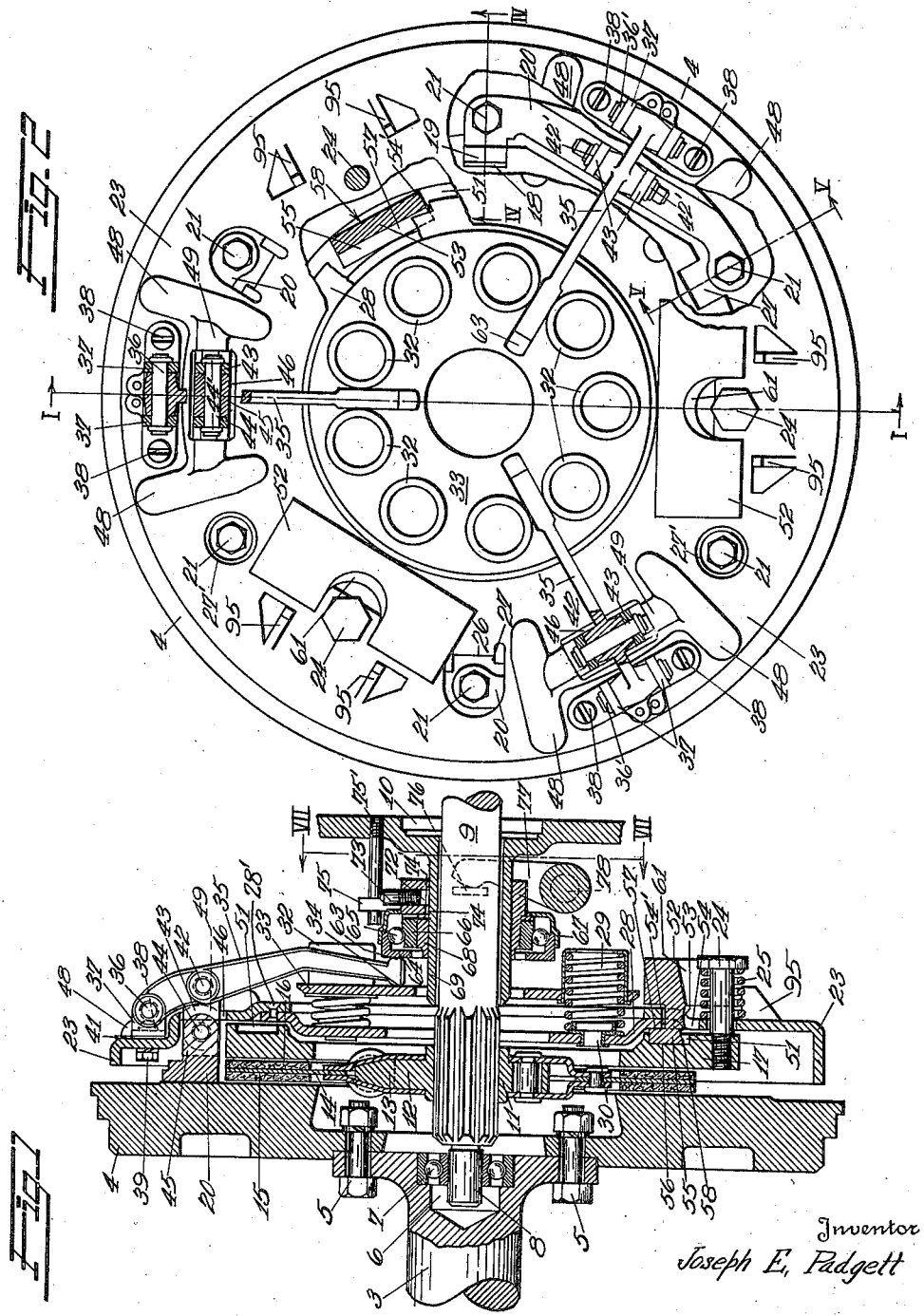
Inventor
Joseph E. Padgett
By Strauch & Hoffman
Attorneys

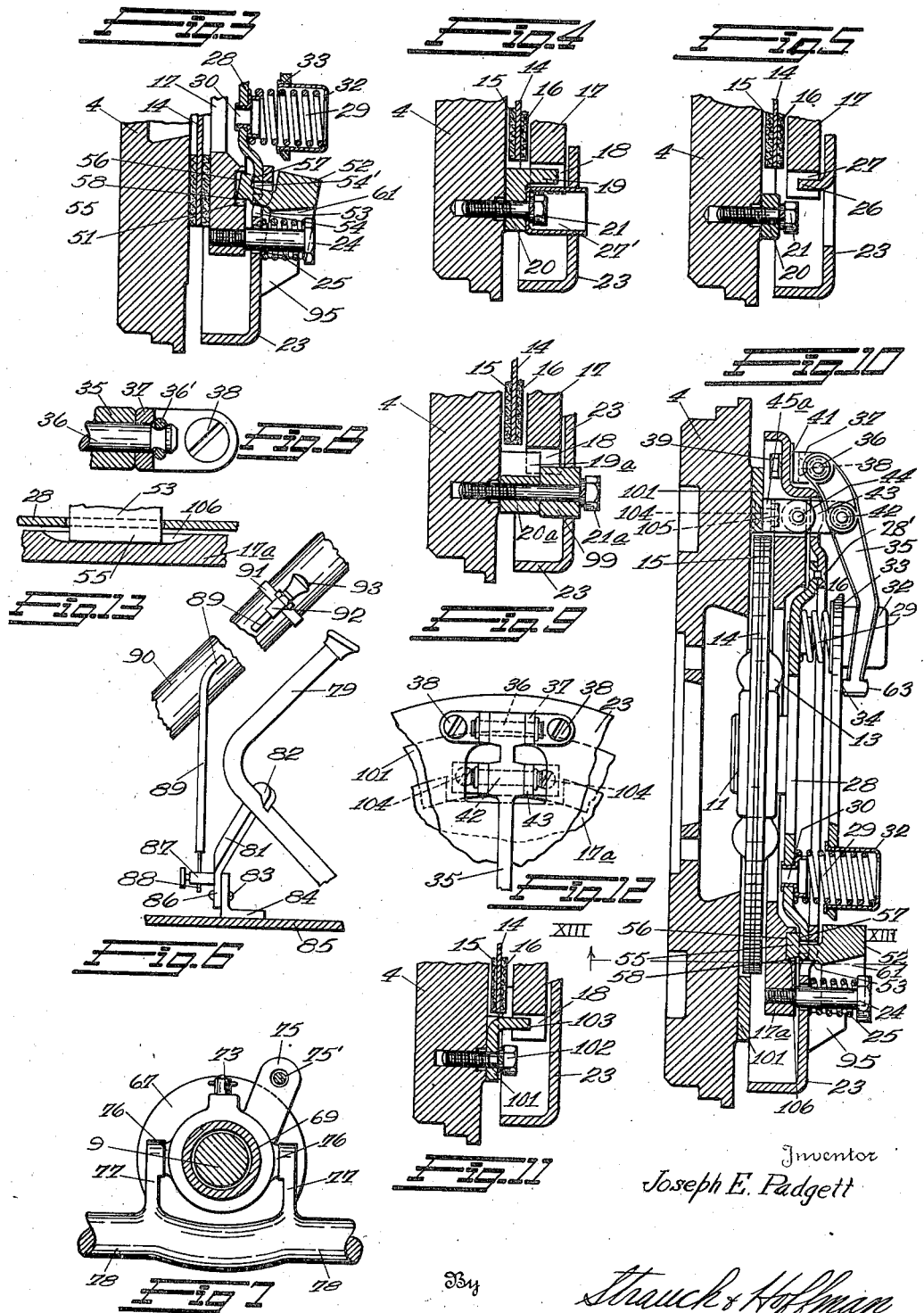

Patented Mar. 22, 1938

2,111,721

UNITED STATES PATENT OFFICE 2,111,721

AUTOMATIC CLUTCH MECHANISM

Joseph E. Padgett, Toledo, Ohio, assignor to Automatic Drive & Transmission Company, New York, N. Y., a corporation of New Jersey Application March 9, 1933, Serial No. 660,179

14 Claims. (Cl. 192—105)

The present invention relates to automatic power transmitting mechanisms. More particularly, the present invention relates to automatic clutch mechanisms for transmitting power from a driving member to a driven member, and although they have operating characteristics that especially adapt them for motor vehicle or similar drives, they are thoroughly practical for use in a wide variety of power transmitting drives.

In co-pending application, Serial Number 606,238, filed April 19, 1932, an automatic clutch mechanism is disclosed wherein a driving clutch plate and a reaction plate are carried and driven by the flywheel, or other rotatable supporting structure, and are mounted for axial movement. Centrifugally operable mechanism is associated with the driving clutch plate and the reaction plate and is adapted to act against the driving plate and react against the reaction plate and cause the driving plate to engage and drive a driven member when the driving plate attains a predetermined speed. The reaction plate is backed up by resilient means so that when the centrifugal mechanism forces the driving plate into engagement with the driven member, pressure gradually builds up in the resilient means and produces a similar pressure build-up between the engaging faces of the driving plate and the driven member, and an extremely smooth operating mechanism is obtained.

In co-pending application, Serial Number 634,047, filed September 20, 1932, an automatic clutch mechanism of this general character is disclosed, and is provided with means for withdrawing the driving plate away from the driven member against the action of the resilient means for the purpose of manually declutching the mechanism without retracting the centrifugally operable mechanism. A mechanism is thereby provided that brings the clutch plates together in response to variations in the speed of the driving plate, and yet that may be readily operated to produce disengagement of the clutch plates with a minimum of effort regardless of the speed imparted to the driving plate.

The present invention provides automatic clutch mechanisms having the highly desirable characteristics of those disclosed in the above-mentioned co-pending applications, and further highly desirable features to be hereinafter pointed out.

It is a primary object of the present invention to provide automatic clutch mechanisms that are simple in design and low in cost; and yet that are efficient and durable and thoroughly practical for incorporation in a wide variety of power transmitting drives.

It is a further major object of the present invention to provide clutch mechanisms that will automatically and smoothly establish a power transmitting connection between a driving member and a driven member when one of the members attains a predetermined speed, that may be readily declutched regardless of the speed of the driving and driven members with a minimum of effort, and that may be readily manufactured by low cost, quantity production methods; and yet that are extremely efficient and stable throughout all of their phases of operation, and that have a long useful life even under severe operating conditions.

Another major object of my invention is to provide automatic clutch mechanisms of the type wherein centrifugally operable mechanism produces clutch engagement, with a member for taking the reaction of the centrifugally operable mechanism that is light in weight, and cheap to manufacture; and yet that is durable, and efficiently performs the functions required of it during all phases of clutch operation.

A further object of the present invention is to provide automatic clutch mechanisms of the character wherein centrifugally operable mechanism applies engaging pressure to one of the clutch plates, with a relatively thin member for taking the reaction of the centrifugally operable mechanism, and the latter is so designed and associated with the mechanism, that it exhibits relatively great rigidity in the region where the centrifugally operable mechanism cooperates with it, whereby distortion thereof in response to pressures applied to it by the centrifugally operable mechanism is prevented.

It is a further object of my invention to provide automatic clutch mechanisms of the type wherein an axially movable driving member is resiliently urged in one direction, with novel means for moving the driving member in the opposite direction, including levers attached thereto and fulcruming and reacting against reaction members operating through apertures formed in the driving member.

Another object of my invention resides in the provision of clutch mechanisms wherein a driving member is urged toward a driven member by the action of springs that act against the driving member and react against levers, with links that extend through apertures in the driving member and are connected to the levers for causing oscillating movement of the levers to compress the springs and produce movement of the driving member away from the driven member.

Still another object of my invention is to provide a clutch mechanism wherein a plurality of springs are employed to exert forces upon a plurality of levers; with a rockable member that is adapted to contact the levers, and has means associated with it for receiving and securely retaining the springs in operative assembled relation, and yet that permits limited rocking movement of the member.

A further object of the present invention is to provide a clutch mechanism wherein a driving member is resiliently urged toward a driven member and levers are attached to the driving member; with means for adjusting the levers with respect to the driving member, whereby parallel relationship of the latter and the driven member may be accurately established and maintained.

It is a further object of my invention to provide novel centrifugally operable mechanisms that are particularly adapted for use in automatic clutches, although they are not limited to such use.

A further object of the present invention is to provide novel mechanism for securely retaining a plurality of springs in cooperative relation between two clutch elements; that is cheap to produce, has an extremely low moment of inertia, and yet that permits the free circulation of ventilating air currents around the springs.

It is another object of my invention to devise, for use in automatic clutches of the plate type, a speed-responsive mechanism that applies driving pressure to three circularly spaced areas of one of the driving clutch plates, whereby the latter is urged into clutching engagement on a three-point support and smooth clutch action is obtained.

Another object of the present invention is to provide novel means for locking driving plates to their respective driving members, in such manner as to allow relative axial movement thereof.

Further objects of my invention will become apparent as the specification proceeds in connection with the annexed drawings, and from the appended claims. In the drawings, Figure 1 is a longitudinal sectional view of an automatic clutch mechanism forming part of my invention and is taken on the line I—I of Figure 2.

Figure 2 is a view of the automatic clutch mechanism shown in Figure 1 as it appears when viewed from the right-hand side of that figure with certain parts removed and broken away in order to more clearly illustrate the structure involved.

Figure 3 is a fragmental sectional view of the lower part of Figure 1 and illustrates the weight there shown in its outermost position and the clutch plates engaged.

Figure 4 is a sectional view taken on the line IV—IV of Figure 2.

Figure 5 is a sectional view taken on the line V—V of Figure 2.

Figure 6 is a diagrammatic elevational view of the clutch pedal of the mechanism illustrated in Figure 1 and the mechanism that is preferably employed for controlling its movements.

Figure 7 is a sectional view of the release or throwout mechanism and is taken on line VII—VII of Figure 1, looking in the direction of the arrows.

Figure 8 is an enlarged fragmental sectional view illustrating the structure I employ for securing the lever pins in place in the mechanism.

Figure 9 is a view similar to Figure 4, but illustrates a modified structure for keying the automatic and reaction plates to the flywheel.

Figure 10 is a longitudinal sectional view illustrating a modified form of automatic clutch mechanism forming part of my invention.

Figure 11 is a fragmental sectional view illustrating the structure employed for keying the automatic and reaction plates to the flywheel in the mechanism shown in Figure 10.

Figure 12 is a plan view of a portion of the mechanism shown in Figure 10, and particularly illustrates one of the lever assemblies and its association with the clutch mechanism, and, Figure 13 is a fragmental sectional view taken substantially on the line XIII—XIII of Figure 10, and illustrates the cooperation of one of the weight heads with a recess formed in the automatic plate.

Referring to the drawings, wherein like reference characters refer to like parts throughout the several views thereof, my automatic clutch mechanism is preferably enclosed in a clutch housing designated generally by the reference character 1, and the latter may assume any desired configuration.

A driving shaft 3 is adapted to have rotational efforts applied to it by a suitable prime mover in any desired manner, and in the present instance it is shown as constituting the crank shaft of an internal combustion engine. The end of the shaft 3 is secured to a flywheel 4 by bolts 5, or in any other suitable manner. Bolts 5 extend through aligned apertures in the flywheel and the flange provided on the end of shaft 3, and have nuts turned thereon.

Shaft 3 is further provided with a bore 6 in which is carried a bearing assembly 7 for supporting the reduced end 8 of a clutch shaft 9. The rear end of shaft 9 is adapted to be journaled in a bearing assembly (not shown) that is preferably located in recess 10 in housing 1.

A hub 11 is splined upon shaft 9 and is provided with a flange 12. Operatively secured to flange 12 by means of rivets or the like is a vibration dampener designated generally by reference character 13 which provides a resilient driving connection between hub 11 and a driven disc 14. This vibration dampener is employed to dampen out any torsional vibrations that may be set up in the crank shaft of the engine, and in view of the fact that it forms no part of the present invention, it will not be further described.

Facings 15 and 16 are secured to opposite sides of disk 14 near its periphery, and they may consist of any material that has the required characteristics to give the correct frictional gripping force, and at the same time has wearing qualities adapting it for this purpose. I prefer, however, to use the types of material which in practice have given very satisfactory results in an automatic slipping drive and clutch mechanism of the "Powerflo" type. Frictional facings 15 and 16 may be secured to disk 14 in any suitable manner, as for instance by rivets or the like, and they, along with disk 14, will be hereinafter referred to as the driven member.

Facing 15, secured to disk 14 cooperates with the flat driving face of flywheel 4 and is adapted to be frictionally driven thereby. Facing 16, cooperates with a plate 17, which will be hereinafter termed the automatic plate for the reason that it is automatically actuated and is adapted to engage and clamp the driven member between it and the flat face of the flywheel. Plate 17 is of substantial thickness so that it may possess a sufficient degree of rigidity to minimize distortion and warpage thereof under the pressures that it is subjected to during operation.

Plate 17 is driven by flywheel 4, and is permitted to move axially thereof for clutching and declutching purposes, by means of recesses or slots 18 formed therein, (Figures 2 and 4) which are disposed at preferably 120° intervals about the periphery of plate 17. Each slot 18 cooperates with a lug 19 formed on one end of a bracket member 20 secured to the flywheel face by means of cap screws 21.

Disposed parallel to automatic plate 17, and also mounted for rotation with flywheel 4, is a plate 23, which will hereinafter be termed a reaction plate because it takes the reaction of the automatic mechanism in a manner presently to be described. Automatic plate 17 and reaction plate 23 are urged toward each other by means of holdback bolts 24 that are threaded into automatic plate 17 and slidably fit in apertures in reaction plate 23. Bolts 24 are encircled by compression springs 25 which seat at one end directly against the reaction plate, and at the other end react against the heads of bolts 24. Bolts 24 are preferably three in number, and are spaced at approximately 120° intervals about the periphery of plates 17 and 23, and are in radial alignment with the weight assemblies so that the forces set up in plate 23 as the result of operation of the latter, does not set up any plate-bending tendencies that would be present if the holdback assemblies were disposed between the weight assemblies. It is to be understood that six or more properly designed holdback assemblies may be used without departing from the spirit of my invention. Automatic plate 17 is keyed to rotate with flywheel 4, and bolts 24 therefore function to cause the reaction plate to rotate with or also be driven by automatic plate 17 and flywheel 4, and when bolts 24 are properly designed this keying means is entirely satisfactory. I preferably, however, employ additional means for keying the reaction plate directly to plate 17 to increase the stability of the mechanism and this structure will now be described.

A plurality of ears or fingers 26 are formed on reaction plate 23 and the apertures resulting from their formation permit a wrench or other tool to be inserted therethrough for manipulating the screws 21 that are associated with the ends of brackets 20 remote from lug 19. Ears 26 extend into recesses 27 that are formed in the periphery of automatic plate 17, and are adapted to lie in driving engagement therewith during all phases of operation.

In addition to the keying means hereinbefore described for keying reaction plate 23 to automatic plate 17, I preferably also provide means for keying reaction plate 23 directly to the flywheel. To this end, cup shaped members 27' are clamped to brackets 20 under the heads of cap screws 21, and are disposed in slidable driving engagement with the walls of the apertures formed in reaction plate 23. Members 27' exert a steadying influence upon reaction plate 23 during all phases of operation of the mechanism and augment the action of fingers 26. Although this additional keying means is preferably employed, it is to be understood that it is not necessary to satisfactory operation of the mechanism, and good results may be obtained with the previously described mechanism operating as the sole keying means for the reaction member.

Reaction plate 23 and automatic plate 17 are normally urged toward the flywheel by means of a spring assembly consisting of a plurality of springs preferably interposed between a pair of annular members. To this end, a second reaction disk or plate 28 is disposed in overlapped relation with plate 22 and a plurality of springs 29 act upon it. Plate 28 is made of sheet metal suitably formed, and it is hardened for the purpose of enabling it to cooperate the centrifugal mechanism with a minimum of friction and wear, in the manner to be presently described.

Plate 28 is provided at suitable intervals around its periphery with spring retainers 30 which are adapted to center one end of springs 29. Retainers 30 are preferably constructed of sheet metal and are inserted in apertures in plate 28 and flanged over to hold them in place. The other ends of springs 29 are received in, and bear against the bottom of a plurality of flanged cups 32, which are located in suitable apertures in a plate 33. The rear face of plate 33 bears against and cooperates with curved faces 34 formed on levers 35. Levers 35 are preferably three in number, so that plate 33, in response to the action of springs 29 is urged into a stable position on a three point support and is thereby caused to exert an equal pressure upon each lever regardless of slight inaccuracies of the levers, holding them tight at all times.

The outer end of each lever 35 is journaled on a pin 36, which in turn is secured in a saddle member 37 having an upturned pair of apertured lugs or ears formed thereon. Pins 36 are secured against rotation and axial displacement in members 37 by means of split rings 36' (see Figure 8), that are sprung into grooves in pins 36 and frictionally bear against the ears formed on saddle members 37. This frictional engagement is effected by so spacing the grooves in pins 36, that rings 36' do not fully seat therein, but bear against the outer walls of the grooves and the outer walls of the ears provided in saddles 37 with a wedging action. This insures oscillation of levers 35 upon pins 36 and prevents oscillation of the latter.

Saddle members 37 are secured to the face of reaction plate 23 by means of bolts 38 and nuts 39, cooperating with apertures formed in plate 23. Before saddle members 37 are applied to the face of plate 23, a plurality of adjustment shims 41 are preferably interposed between them and plate 23, for a purpose that will presently appear.

Each lever 35 is apertured intermediate its ends, and is provided with a pin 42 upon which the outer ends of a pair of link members 43 are secured. The other ends of each pair of links 43 are provided with a pin 44 rigidly secured therein and which is journaled in a saddle member 45 preferably formed as an integral part of bracket 20. Although I prefer to construct brackets 20 as separate members, it is to be understood that they may be integrally formed as a ring member.

Pins 42 and 44 are preferably secured in place in links 43 by split rings 42' and 44' sprung into grooves in pins 42 and 44 respectively, but they are not wedged in place as described in connection with rings 36'. Saddle portions 45 of brackets 20 extend through suitable apertures 46 formed in reaction plate 23. Plate 23 is preferably stiffened or reinforced against flexing in the region of the lever and saddle assemblies by means of dished out portions 48, and chordal portions 49, that are formed by suitable stamping operations.

Reaction plates 23 and 28 form in effect a single reaction member and they are urged toward the automatic plate by means of hold back assembly springs 25, which clamp the plate 28 and heads 55 of the weights 52 between automatic plate 17 and reaction plate 23. Plates 23 and 28 are preferably secured together by means of circularly spaced rivets 28' and as the normal speed responsive operation tends to force plates 23 and 28 together, rather than separate them, the securing means need not be extremely strong. Under these conditions, heads 55 of weights 52 act upon the over-lapped region of plates 23 and 28 in such manner as to maintain them in overlapped relationship. Springs 29, however, are normally restrained from moving reaction member 23 and automatic plate 17 toward the flywheel, when the latter prime mover is operating at a predetermined idling speed, by means of a throwout mechanism that operates on levers 35, and which will be presently described.

In view of the fact that the outer ends of levers 35 may be adjusted toward and away from reaction plate 23 by inserting or withdrawing shims 41, proper parallel relationship of the clutch parts may be brought about by inserting or withdrawing shims from the proper saddle assemblies. It is contemplated that the shim adjustment shall be primarily in the nature of an initial factory adjustment for the reason that, when the clutch mechanism is in use, there is no tendency for automatic plate 17 and reaction members 23 and 28 to work themselves into non-parallel relation with flywheel 4, because the wear that does occur on the face of each lever 35, as the result of operation, will occur to an equal extent on each of them because they are acted upon by an equal force, namely, one-third of the total pressure exerted by springs 29 due to the three point nature of the connection existing between the plate 33 and the levers.

Springs 29 and their retaining means adequately restrain plate 33 from rotating with respect to plate 28, but it is to be understood that suitable guiding or keying means may be associated with these plates for preventing relative rotation thereof.

The preferred speed-responsive, or centrifugally operable actuating mechanism will now be described. The rear face of automatic plate 17 is provided with an annular recess 51 which is preferably rectangular in cross section, and which provides a flat bottom face against which the automatic or centrifugal weights fulcrum and act to cause clutch engagement. Centrifugally operable weights, designated generically by reference character 52, are preferably three in number, and are symmetrically disposed between the lever and saddle assemblies. Each centrifugal weight is provided with a lever section 53, which is of substantial width and is received in aligned apertures 54 and 54' formed in plates 23 and 28 respectively. Lever sections 53 carry heads 55 at their extremities, each of which is provided with a flat face 56 that normally abuts the bottom face of annular recess or groove 51 in plate 17 when driving shaft 3 is operating at idling speeds or is stationary. Heads 55 are also provided with a reaction face 57, which abuts the face of reaction plate 28 at all times, and is designed for fulcruming engagement therewith during operation of the weights. The surface of plate 28 that cooperates with the faces 57 of weight-heads 55 is preferably ground and polished so that relative sliding movement may occur with a minimum of friction.

Heads 55 have their outer sides relieved to provide knife-like edges 58 which are adapted to rotate or pivot on the bottom face of recess 51 formed in automatic plate 17. The relieving operation enables a good knife edge 58 to be formed on each weight head, and allows pivotal movement thereof without interference from the outer side walls of groove 51.

Referring more particularly to Figure 2 of the drawings, each extremity of knife edge 58 is seen to engage the outer wall of recess 51, while the inner face of head 55 engages the inner wall of recess 51, thereby preventing rotation of head 55 and keeping the weight in proper assembled relation at all times. Weights 52 are prevented from moving circumferentially within recess 51 by the engagement of the walls of recesses 54 and 54' formed in plates 28 and 23, with the sides of levers 53. Knife edges 58 are adapted to cooperate with the flat bottom face of recess 51 and thereby act in line contact upon plate 17 for a substantial distance across the face thereof, whereby uniform distribution of pressure around the entire area of the automatic plate is effected. Each weight 52 is further provided with a recess 61 which allows free operation thereof without interference from holdback bolts 24.

The seat formed by the bottom of annular groove 51, and its outer side wall constitute bearing recesses in which edges 58 of weight heads 55 fulcrum, and although I prefer to employ this arrangement, it is to be understood that various changes may be made, if desired, without departing from the spirit of the present invention.

The mass of weights 52, and the number employed in a particular installation is determined by a consideration of the required pressure that they must transmit under the desired speed conditions to urge the clutch plates into final non-slipping engagement. In the automatic drive clutch mechanism shown, three equally spaced weight assemblies are preferably employed.

When shaft 3 is stationary, or is operating at a speed corresponding substantially to the idling speed of the prime mover employed to drive it, the parts assume the position in which they are shown in Figure 1. Heads 55 of weights 52 are clamped between plates 17 and 28, under the influence of springs 25 acting against plate 23 and holdback bolts 24, and plate 23 is held in the position shown, against the action of springs 29, by means of a throwout mechanism that will now be described.

Cooperating with curved faces 63 formed on levers 35 is the flat face of a ball race 64, which cooperates with anti-friction balls 65 disposed between race 64 and a cooperating ball race 66. Ball races 64 and 66 are held in assembled relation with respect to each other by means of a combined retainer and reservoir defining member 67. Ball race 66 is rigidly mounted upon a sleeve 68 which is slidably mounted upon a hollow supporting member 69. The latter is preferably integrally formed with housing 1 and is accurately machined to be disposed in axial alignment with the clutch mechanism and prime mover shaft 3 when the clutch is assembled, and is designed to provide a close sliding fit with sleeve 68. Member 69 is preferably spaced substantially from, and is independent of shaft 9. Sleeve 68 is provided with a tapped bore 72 into which a grease fitting 73 of well known construction is screwed. Bore 72 communicates with an axially extending passage 74 formed in sleeve 68 so that lubricant introduced through bore 72 provides lubrication for axial movements of sleeve 68 and also provides lubrication for the bearing assembly through a passage 74' communicating with passage 74 and reservoir defining member 67 associated with the bearing assembly.

Sleeve 68 is prevented from rotating about support 69 by means of an apertured lug 75 formed on sleeve 68. A stud 75' is slidably received in lug 75 and is threaded into an aperture in housing 1. Formed on opposite sides of sleeve 68 are lugs 76 which cooperate with throwout fingers 77 rigidly carried by a throwout shaft 78. Shaft 78 is preferably journaled in, and extends outwardly of clutch housing 1 and carries on the end thereof a clutch pedal 79 which is secured against rotation thereon.

Although I have disclosed a specific throwout assembly in connection with my invention, it is to be understood that any suitable throwout mechanism having a face that is normal to the clutch axis for cooperating with the inner ends of levers 35 may be employed if desired.

Before proceeding to further structure, it should be observed that driven shaft 9 is entirely clear of supporting sleeve 69, the latter being stationarily mounted in the clutch housing or casing. Therefore, substantial eccentric, or angular misalignment of driving shaft 3 and driven shaft 9 can have no effect whatever upon the operation of the throwout bearing assembly and its cooperation with levers 35. Moreover, since driving shaft 3 is the crank shaft of the engine, and the bearing face of the support 69 is carefully machined to lie disposed exactly parallel to driving shaft 3, their permanent alignment is assured and the throwout bearing assembly, providing springs 29 are properly assembled, causes plates 17 and 23 to be disposed in parallel relation to the flywheel face at all times, regardless of whether the clutch is engaged or disengaged. Moreover, levers 35 will be held tight at all times, regardless of manufacturing inaccuracies, or inaccuracies that arise due to wear, by the three point support on the face of the throwout bearing assembly while the throwout bearing is positively maintained in proper alignment by virtue of the stationary guiding means formed on the clutch housing, providing smooth clutch action with minimum pedal operating pressures at all times in a low cost construction requiring a minimum of manufacturing accuracy.

It should furthermore be noted that the entire absence of an obstructing rim on the flywheel, and of the usual cover or any other structure associated with the clutch mechanisms that might impede air flow induced by the rotation of the clutch elements or inhibit free radiation of heat therefrom, and also the plane face of the flywheel beyond the driving face thereof, provides for the rapid dissipation of heat from the clutch elements by radiation and convection. There is no tendency for the parts to overheat and possibly draw the temper of springs 29, because retaining members 30 and 32 associated with the latter allow free circulation of ventilating air currents about springs 29.

It is further evident, that as the facing material wears particles of solid lubricant and dust dislodged therefrom are free to leave the clutch mechanism and be carried away by the air stream induced by rotation of the clutch elements.

The absence of the usual rim on the flywheel moreover materially reduces machining and production costs and adapts the mechanism readily to large volume, low cost production methods.

The clutch pedal is preferably adjustably held by a suitable mechanism about to be described in such a position that the throwout bearing assembly will hold the parts in the positions in which they are shown in Figure 1 when the driving shaft 3 is stationary or is operating at a predetermined idling speed of the prime mover utilized therewith. Under these conditions, a clearance exists between the plates and there is accordingly no driving connection between shafts 3 and 9.

The mechanism for maintaining the throwout bearing assembly in its automatic engaging position is illustrated in Figure 6, and comprises a latch member 81 having a hook portion 82 that provides a pedal engaging latching face. Latch member 81 is pivoted at its lower end on a pin 83 that is connected to bracket 84, and the latter is secured to any stationary part of the vehicle such as 85, in any well known manner.

Preferably formed on latch member 81, adjacent the pivot thereof is a laterally extending finger 86 having an apertured member 87 swivelled thereto. A control wire 88 is secured in member 87 by means of a set screw or the like and is held and guided in a suitable flexible housing 89. Housing 89 is led to a suitable operating location in the interior of the vehicle, for instance to the upper end of the vehicle steering column 90, and is secured thereto by means of a clamp member 91 or the like.

A friction control member 92 is incorporated in the upper end of casing 89 and serves to hold the control wire in any selected position. Provided on the upper end of wire 87 is a suitable operating knob 93 for shifting wire 87 and moving latch member 81 into operative and inoperative position. With the clutch pedal latched in the position shown in Figure 6, and the engine or other prime mover operating at idling speed or stationary, the clutch plates assume the idle release position shown in Figure 1. This position of the clutch pedal will hereinafter be referred to as the automatic position, and is so termed because the pedal is preferably disposed in this position when the clutch functions, or is being employed as an automatic or speed-responsive clutch.

Clutch pedal 79 may be depressed or moved to the left of the position shown in Figure 6, for manually declutching the mechanism in a manner to be hereinafter pointed out, and the parts of the latch mechanism are so designed to allow this movement of pedal 79 without interference.

Knob 93 may be operated to swing latch member 89 and bring its latch face out of the path of the clutch pedal and allow the latter to move to the right into what is termed its manually engaged position, and this operation will be further amplified as the specification proceeds.

With the clutch disposed in automatic position, the speed-responsive, or automatic operation of the mechanism is as follows:

*Automatic operation*

As driving shaft 3 and flywheel 4 are accelerated, weights 52 gradually swing or rock outwardly about their edges 58 as axes in response to centrifugal force. As this occurs, reaction faces 57 of heads 55 abut and slide on the face of plate 28 (which is preferably hardened to give it good wearing qualities) and knife edges 58, by virtue of their engagement and fulcruming action upon the flat bottom surface of recess 51, in automatic plate 17, force automatic plate 17 away from reaction plates 23 and 28 against the action of holdback springs 25 and into engagement with facing 16 of disk 14, on a three-point support, thus causing disk 14 to move axially and bring the facing 15 thereof into contact with the flywheel face. After the driven member is thus clamped or gripped between automatic plate 17 and flywheel 4, further movement of weights 52 causes faces 57 of heads 55 to force reaction plates 23 and 28 away from the flywheel against the action of springs 29. Accordingly, as weights 52 swing outwardly and bring the driving and driven members into clutching engagement, reaction member 28 is forced away from the flywheel against the action of springs 29 and a yielding or resilient engaging pressure is established between the plates. In view of the resilient nature of the backing means for the reaction member, should certain weights 52 swing further outwardly than the remaining weights, the pressure exerted thereby will nevertheless be uniformly distributed about the periphery of plate 17 for the reason that the reaction plate 23 can tilt or float and take a slight angular position with respect to automatic plate 17, due to the fact that its sole movement limiting means is constituted by springs 29.

A power transmitting coupling is thus automatically established between the driving and driven members, and when shaft 3 attains a speed that is predetermined by the design of the mechanism, the parts appear as they are seen in Figure 3 of the drawings. Referring to this figure, the centrifugal weight there shown is disposed in its outermost position, and automatic plate 17 and reaction plate 23 are shown in their separated positions, at which time driven member 14, carrying faces 15 and 16, is clamped securely between automatic plate 17 and flywheel 4, and the pressure urging them into contact under these conditions is such that they are in non-slipping engagement, thus providing a positive friction coupling between shafts 3 and 9. Under these conditions, weights 52 lie in contact with stop members 95 that are preferably struck out of plate 23. Members 95 provide definite stops for each centrifugal weight assembly, so that at extremely high speeds, the driving pressure between automatic plate 17 and the driven member does not exceed a definite predetermined magnitude. Stops 95 also perform the highly desirable function of definitely stopping all of the weights in a common plane, normal to the axis of the mechanism, so that at high speeds, dynamic balance of the entire mechanism is insured, and vibration thereof avoided. Although I have disclosed stops 95 as being struck out of plate 23, it is to be understood that they may be formed on separate bracket members and this structure is intended to be embraced by the present invention. It is also within the scope of this invention to design the stops 95 so that they may be attached to the flywheel 4 and project through suitable apertures in reaction member 23. It is preferable, however, to stop the weights against the reaction plate, because if the stops are carried by the flywheel or other supporting structure independent of the reaction member, declutching tendencies develop at high speeds unless the parts are specially designed.

As the prime mover accelerates, centrifugal weights 52 swing outwardly and cause the driven member to be clamped between the automatic plate and the flywheel in the manner just described. Movement of automatic plate 17 away from reaction member 23 is opposed by holdback springs 25 and therefore weights 52 are held under control. Holdback springs 25, therefore, in addition to predetermining the speed of the mechanism at which automatic engaging operation is initiated, exert a steadying influence upon the clutch parts. As weights 52 swing further outwardly, after completion of automatic plate movement, they react against plate 23 to cause pressure to be gradually built up in springs 29 and this gradual building up of pressure causes the torque that is transmitted from shaft 3 to shaft 9 to gradually increase in magnitude, and gives the mechanism smooth operating characteristics.

When the automatic engaging operation just described is being effected, reaction member 23 and its associated parts are moved to the right of the position shown in Figure 1. Movement of reaction plate 23 causes the inner ends of levers 35 to move from their cooperating engagement with the face of ball race 64 thereby relieving the throwout bearing assembly of pressure. The throwout bearing assembly therefore only operates when the clutch is operating at idling speeds or is manually declutched and therefore has a long life. From the above discussion, it will be apparent that the throwout bearing receives only a minimum amount of wear and its operative life is therefore greatly increased.

With the above described mechanism installed in a motor vehicle provided with a conventional three-speed transmission, and the vehicle is on a substantially level surface, the transmission may be placed in high gear, if the engine is operating below the engaging speed of the clutch mechanism, and the engine may be accelerated to produce automatic clutch engagement in the manner previously described. During the engaging operation, a slipping drive exists between shafts 3 and 9 and the vehicle is accelerated smoothly and without shock; and in view of the speed-responsive engaging characteristics of the mechanism, it is impossible to stall the engine through improper actuation of the accelerator. When the engine and vehicle speeds are properly correlated, the clutch plates are brought into full driving engagement, thereby establishing a direct coupling between shafts 3 and 9.

When operating in this manner, and it is desired to decelerate or stop the vehicle, the accelerator is released and the brakes are applied. When the vehicle has decelerated to a speed corresponding substantially to engine idling speed, through the combined braking action of the engine and the vehicle brake mechanism, weights 52 rock inwardly under the influence of holdback springs 25 and disengagement of the clutch plates is automatically effected. Shafts 3 and 9 are thereby automatically uncoupled and the braking action of the engine is no longer transmitted to shaft 9, but in view of the fact that the disengaging speed of the clutch mechanism is fairly low, the vehicle is decelerated to a relatively low speed under the braking influence of the engine before the mechanism automatically disconnects shafts 3 and 9.

The vehicle may be brought to a complete stop by continued application of the brakes, or, if traffic conditions permit, the accelerator may be depressed and the engine accelerated to cause almost immediate re-engagement of the mechanism and the vehicle again picked up in high gear.

Due to its slipping drive characteristics, the present mechanism constitutes a drive mechanism as well as a clutch, and while it does not multiply the torque delivered from shaft 3 to shaft 9, it permits the engine to operate at a higher speed, and, consequently, on a higher point on its speed-torque curve, than if substantially non-slipping conditions existed between shafts 3 and 9, and this feature, in combination with the lubricated facings and self-cooling characteristics of the present mechanism, renders it entirely feasible to operate a vehicle in which it is incorporated in high gear under normal conditions.

Manual disengaging operation

When the plates have been brought into full driving engagement in the manner previously described, clutch pedal 79 may be depressed to displace the throwout bearing assembly and the inner ends of levers 35 to the left of the positions in which they are shown in Figure 1. Movement of levers 35 in this manner causes them to fulcrum about and react against pins 44 and withdraw reaction plate 23 away from the flywheel. Withdrawal of reaction plate 23 produces withdrawal or disengagement of automatic plate 17 from the driven member because plates 17 and 23 are held in unitary relation by the holdback assemblies. If the engine speed is maintained above the predetermined engaging speed during the manual declutching operations, weights 52 remain in their outermost positions; therefore, the declutching operation does not involve retracting the weights against the action of centrifugal force, which, at high speeds might be excessive.

In traffic, when it is desired to get the vehicle away quickly, and in starting up steep grades, the clutch pedal may be operated in this manner to disengage the plates for gear shifting purposes as in a vehicle provided with a manually operable clutch. The clutch pedal may also be operated to produce manual engagement of the plates, (if the engine is operated above the engaging speed of the mechanism) for maneuvering the vehicle into and out of parking positions or navigating in heavy traffic.

Manual engaging operation

As has been previously pointed out, when shaft 3 is operating substantially at the idling speed of the prime mover, or is stationary, and the clutch pedal is latched in the position shown in Figure 6, a clearance exists between the clutch plates as shown in Figure 1, and shafts 3 and 9 are accordingly disconnected. When it is desired to establish a driving connection between shafts 3 and 9 under these conditions, knob 93 is actuated which swings latch member 81 out of latching relation with pedal 79, and allows the latter to move to the right into its retracted position. Retraction of the clutch pedal allows the throwout bearing assembly to move to the right under the influence of springs 29, and the latter, acting through levers 35, bring reaction plates 23 and 28 and automatic plate 17 to the left of the positions in which they are shown in Figure 1, with automatic plate 17 in driving engagement with the driven member, thereby coupling shafts 3 and 9.

With the above described mechanism installed in a motor vehicle, it is sometimes desirable to effect this manual engaging operation. For instance, when the motor is cold and the battery is low, it is desirable to place the transmission in gear and push or coast the vehicle to turn the engine over. Also when stopping on a steep grade, positive engagement of the clutch, with the transmission placed in low or reverse gear, provides an emergency brake that cannot be inadvertently released; or if the motor stalls, from lack of fuel or any other cause, the vehicle can pull out of dangerous positions by propelling it in low gear with the starting motor.

Although I have disclosed, and prefer to employ a reaction member that is made up of two plates 23 and 28, that overlap and provide a stiffened or re-enforced area for taking the reaction of the automatic weights without undergoing harmful distortion, it is to be understood that the reaction member may be constructed of a single plate member that is so designed as to provide sufficient rigidity without departing from the spirit of the present invention. On the other hand, a single sheet metal plate may be "crimped" or folded upon itself in the region where the weights cooperate with it in order to re-enforce it against flexing, or separate pieces may be secured to the plate for performing this function, and the latter may be suitably hardened and polished to enable them to cooperate with faces 57 of weights 52 with a minimum of wear.

Referring to Figure 9 of the drawings, I have disclosed a modified keying assembly for the mechanism illustrated in Figure 1. In this form of the invention, bracket members 20a are relatively thick and are provided with lug portions 19a that are received in the recesses 18 formed in automatic plate 17. Clamped between the face of bracket members 20a and the heads of relatively long cap screws 21a are cylindrical members 99, that are slidably received in apertures located in reaction plate 23. This keying assembly functions in substantially the same manner as that previously described.

Referring to Figures 10, 11, 12, and 13, I have shown the automatic clutch mechanism illustrated in Figures 1 to 8 inclusive having certain parts thereof modified in the manner that will now be described.

In this form of the invention, automatic plate 17a is keyed to the flywheel by means of an annular plate member 101, that is secured to the face of the flywheel by cap screws 102 or the like. Plate member 101 is preferably made of heavy gauge sheet metal and is preferably cut and formed in a die-forming process to provide three symmetrically spaced fingers 103, that project away from the flywheel and are slidably associated with recesses 18 formed in automatic plate 17. Reaction plate 23 is keyed to automatic plate 17 in the manner described in connection with Figure 1.

Pins 44, that support links 43, are supported by saddles 45a that provide a pair of ears and which are secured to plate member 101 by means of bolts 104 and nuts 105.

Referring more particularly to Figures 10 and 13 of the drawings, individual recesses 106 are formed in automatic plate 17a for receiving the heads 55 of weights 52. Recesses 106 are rectangular in cross-section and snugly receive weight heads 55, but permit the latter to freely rock about their knife edges 58 as axes or fulcrums within the dihedral angles defined by the bottom and outer walls of recesses 106.

Recesses 106 are preferably formed in plate 17 by means of a milling cutter and this accounts for the configuration they assume in Figure 13 of the drawings. It is to be understood however that recesses 106 may be formed in plate 17 in any desired manner, the essential requirement in any case being a flat face, against which faces 56 of heads 55 may lie when the engine is operating at idling speed, and a plane outer wall that cooperates with the bottom wall to define an angular seat or bearing for knife edges 58. The inner walls of recesses 106 also perform the important function of retaining the weight heads with their knife edges in cooperating relationship with the angular seats, but may be omitted if the apertures 54 and 54' in plates 23 and 28 are modified to perform this function. It is to also be understood that the relation of the bearings and knife edges to the mechanism may be reversed without departing from the spirit of the present invention. For instance, the knife edges may be provided on plate 17 and the bearings or knife edge seats may be formed in weight heads 55 if desired.

It should also be observed that weights having unrelieved heads may be employed by properly relieving the outer walls of recesses 106, in order to allow free rocking motion of the weights in response to centrifugal force, without in any way departing from the spirit of my invention.

Although I have disclosed, and prefer to employ clutch mechanisms of the "single plate" type, i. e., clutch mechanisms having two driving members and a single driven member, it is to be distinctly understood that my invention contemplates clutch mechanisms wherein three or more driving members cooperate with two or more driven members to effect a driving connection between the driving and driven shafts, and the appended claims are intended to embrace clutch mechanisms of this character.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:

1. In an automatic clutch mechanism, an automatic plate; a reaction plate; centrifugally operable elements having portions disposed between said plates; a second reaction plate overlapping said first named reaction plate; and common means tending to retain said reaction plates in rigidly assembled relationship and for clamping said portions of said elements between said automatic plate and said first named reaction plate.

2. In an automatic clutch mechanism, a driving member adapted for engaging and disengaging cooperation with a driven member; a plurality of centrifugally operable elements having rectangular heads seating in recesses formed in said driving member, said recesses having subtantially parallel side walls, and plane bottom wall portions that are co-extensive with the rectangular portions of said heads, each of said bottom wall portions merging at each end with curved bottom wall portions that merge into a surface of said driving member, and means for preventing movement of said elements into contact with the curved bottom wall portions of said recesses.

3. In a clutch, a driving member and a reaction member mounted for rotation and adapted to undergo relative axial movement; resilient disengaging means adapted to apply forces to a plurality of regions of said reaction member and urge the same toward said driving member; resilient engaging means tending to bodily urge said members in one direction and adapted to apply forces to regions of said reaction member which are located substantially radially with respect to said first named regions; and means adapted to apply active forces to said driving member and apply reactive forces to said reaction member and force said members apart against the action of said resilient disengaging and engaging means, said last named means being adapted to apply forces to regions of said reaction member which are located closely adjacent to and radially intermediate said first and second named regions, whereby harmful flexure of said reaction member, in response to the forces applied to it, is avoided.

4. The clutch described in claim 3, wherein said last named means is automatically operable in response to variations in the rotative speed of said driving member.

5. The clutch described in claim 3, wherein said resilient disengaging means comprises a plurality of springs acting against said reaction member, and said resilient engaging means comprises a plurality of groups of springs which act upon regions of said reaction member that are substantially centrally intersected by radii containing said disengaging springs.

6. In an automatic clutch, in sub-combination, a driving plate; a reaction member operably associated with said driving plate and comprising a pair of overlapped elements; means adapted to apply forces to the overlapped region of said elements and urge them away from said driving plate; and resilient means adapted to apply forces to a region of one of said elements and urge them toward said driving plate, said first named means being operable to tend to maintain said elements in overlapped relationship.

7. An automatic clutch mechanism comprising, driving and driven members mounted for engagement and disengagement; centrifugally operable mechanism for producing engagement of said members when one of said members attains a predetermined speed; means for taking the reaction of said centrifugally operable mechanism, comprising a plurality of members overlapped and secured together in the region where they cooperate with said centrifugal mechanism, whereby distortion of said reaction means in response to reaction forces applied thereto by said centrifugally operable mechanism is prevented, and resilient means for urging one of said overlapping members in one direction, and the other of said over-lapping members being provided with means for moving said members in the other direction against the action of said resilient means.

8. In an automatic clutch in sub-combination, a driving member, a reaction member adapted to rotate synchronously with said driving member and operable to undergo axial movement with respect thereto; a centrifugally operable lever element disposed between said driving and reaction members and operable to force them apart when it rocks outwardly; a second reaction member overlapping said first named reaction member in a region where the latter cooperates with said centrifugally operable lever element; and resilient means connected to said driving member and the second named reaction member for urging all of the parts toward each other for clamping said lever element and said first named reaction member therebetween.

9. The clutch mechanism described in claim 8, wherein said first and second named reaction members are permanently and rigidly secured together in the region of their over-lap.

10. The automatic clutch described in claim 8, wherein said first named reaction member functions as a force transmitting and distributing member and is provided with a plurality of springs which act thereupon.

11. In an automatic clutch, a driving member, a substantially annular reaction member mounted for synchronous rotation with said driving member and adapted to undergo axial movement with respect thereto; a second annular reaction member also mounted for synchronous rotation with said driving member and having its outer peripheral portion over-lapped by the inner peripheral portion of said first named reaction member; spring means acting upon said second named reaction member and urging the same towards said driving member; and a plurality of centrifugally operable elements having portions disposed between said driving member and said first named reaction member and acting against the over-lapped portion thereof.

12. The clutch mechanism described in claim 11, wherein said centrifugally operable elements are adapted to engage said first named reaction member and said reaction members are provided with means for securing them together in the region of their over-lap.

13. In an automatic clutch mechanism, a plurality of centrifugally operable elements; means for taking the reaction of said elements comprising a plurality of members having overlapping portions, said elements extending through aligned apertures formed in said members, and contacting and applying pressure to the surface of one of said members in the region where it is overlapped by said other member, when said elements operate centrifugally.

14. In a clutch sub-combination, a rotatable supporting member; a driving plate having recesses in its outer peripheral edge; spring means; means for causing said driving plate to rotate synchronously with said supporting member and for fulcruming levers which are operable to transmit forces from said spring means to said driving plate, comprising a plurality of elongated bracket members secured at their ends to said supporting member beyond said peripheral edge of said driving plate, said bracket members having portions adjacent the ends thereof extending inwardly and slidably associated with said recesses in said driving plate.

JOSEPH E. PADGETT.